United States Patent
Zidek

(10) Patent No.: US 10,928,827 B2
(45) Date of Patent: Feb. 23, 2021

(54) SYSTEMS AND METHODS FOR GENERATING A PATH FOR A VEHICLE

(71) Applicant: Toyota Research Institute, Inc., Los Altos, CA (US)

(72) Inventor: Robert A. E. Zidek, Ann Arbor, MI (US)

(73) Assignee: Toyota Research Institute, Inc., Los Altos, CA (US)

(*) Notice: Subject to any disclaimer, the term of this patent is extended or adjusted under 35 U.S.C. 154(b) by 174 days.

(21) Appl. No.: 16/283,998

(22) Filed: Feb. 25, 2019

(65) Prior Publication Data

US 2020/0218261 A1 Jul. 9, 2020

Related U.S. Application Data

(60) Provisional application No. 62/789,008, filed on Jan. 7, 2019.

(51) Int. Cl.
  *G05D 1/02* (2020.01)
  *G06K 9/00* (2006.01)
  (Continued)

(52) U.S. Cl.
  CPC ....... *G05D 1/0238* (2013.01); *B60W 50/0097* (2013.01); *B60W 50/0205* (2013.01);
  (Continued)

(58) Field of Classification Search
  CPC .. G05D 1/0238; G05D 1/0055; G05D 1/0088; G05D 1/0212; G05D 1/0231;
  (Continued)

(56) References Cited

U.S. PATENT DOCUMENTS 6,401,034 B1 6/2002 Kaplan et al.
2002/0183987 A1 12/2002 Chiang
(Continued)

OTHER PUBLICATIONS

Fang Mao-hui, Xu Jun, Research on Trajectory Planning Algorithm of Unmanned Aerial Vehicle Based on Improved A* algorithm, 2017, School of Aerospace Engineering, Beijing Institute of Technology, Beijing 100081, China pp. 1348-1352 (Year: 2017).*

(Continued)

*Primary Examiner* — Marthe Y Marc-Coleman
(74) *Attorney, Agent, or Firm* — Christopher G. Darrow; Darrow Mustafa PC

(57) ABSTRACT

System, methods, and other embodiments described herein relate to generating a path for a vehicle to travel. In one embodiment, a method includes receiving left and right boundary points of a corridor in which the vehicle is to travel and creating point pairs from the left and right boundary points. Respective ones of the point pairs include one of the left boundary points and one of the right boundary points that is a closest corresponding point of the right boundary points. The method further includes generating an output path according to an optimization problem that determines path points, with a respective one of the path points for each of the point pairs. The point pairs function as hard constraints for the corresponding respective ones of the path point.

20 Claims, 5 Drawing Sheets

(51) Int. Cl.
*B60W 50/14* (2020.01)
*G05D 1/00* (2006.01)
*B60W 50/00* (2006.01)
*B60W 50/02* (2012.01)
*B60W 50/029* (2012.01)
*G07C 5/08* (2006.01)

(52) U.S. Cl.
CPC .......... *B60W 50/029* (2013.01); *B60W 50/14* (2013.01); *G05D 1/0055* (2013.01); *G05D 1/0088* (2013.01); *G05D 1/0212* (2013.01); *G06K 9/00798* (2013.01); *G06K 9/00805* (2013.01); *G07C 5/0808* (2013.01); *B60W 2050/0083* (2013.01); *B60W 2050/021* (2013.01); *B60W 2050/0215* (2013.01); *B60W 2050/146* (2013.01); *G05D 1/0231* (2013.01); *G05D 1/0255* (2013.01); *G05D 1/0257* (2013.01); *G05D 2201/0213* (2013.01)

(58) Field of Classification Search
CPC .............. G05D 1/0255; G05D 1/0257; G05D 2201/0213; B60W 50/0097; B60W 50/0205; B60W 50/029; B60W 50/14; B60W 2050/0083; B60W 2050/021; B60W 2050/0215; B60W 2050/146; G05C 5/0808; G06K 9/00805; G06K 9/00798

See application file for complete search history.

(56) References Cited

U.S. PATENT DOCUMENTS

| | | |
|---|---|---|
| 2007/0179685 A1 | 8/2007 | Milam et al. |
| 2014/0032017 A1 | 1/2014 | Anderson et al. |
| 2016/0313133 A1 | 10/2016 | Zeng et al. |
| 2019/0286921 A1* | 9/2019 | Liang .................. G06T 7/70 |
| 2020/0086855 A1* | 3/2020 | Packer .................. G08G 1/161 |

OTHER PUBLICATIONS

Chao Li, Xiaohui Li, Junxiang Li, Qi Zhu, and Bin Dai, Trajectory Planning for Autonomous Ground Vehicles Driving in Structured Environments, 2017,the College of Mechatronic Engineering and Automation National University of Defense TechnologyChangsha, P. R. China, pp. 21-46 (Year: 2017).*

Dolgov, et al. "Path Planning for Autonomous Vehicles in Unknown Semi-structured Environments", The International Journal of Robotics Research 2010 29: 485 originally published online Jan. 25, 2010.

* cited by examiner

SYSTEMS AND METHODS FOR GENERATING A PATH FOR A VEHICLE

CROSS-REFERENCE TO RELATED APPLICATIONS

This application is based upon and claims the benefit of priority of U.S. Provisional Application No. 62/789,008, filed on Jan. 7, 2019, the entire contents of which are incorporated herein by reference.

TECHNICAL FIELD

The subject matter described herein relates, in general, to a system and method for generating a path for a vehicle, and, more particularly, to efficiently generating a path that enforces hard boundary constraints.

BACKGROUND

Path generation can refer to the process used by autonomous and semi-autonomous vehicles to generate or select a path to follow. For example, a vehicle may use sensors to identify a position in a road lane, such as a centerline position, and generate a path that follows the identified position. The vehicle may continuously update the path as the vehicle travels along the road segment. That is, the vehicle may have sensing and localization capabilities to re-plan the path online while incrementally building an obstacle map.

Continuously generating a path that yields a desired behavior (e.g., avoids obstacles) while also considering other factors such as comfort (e.g. avoiding sharp turns) and travel time (e.g., avoiding lengthening the path) can be challenging and computationally complex due to the amount of calculations required. The difficulty increases when the vehicle is traveling on an unknown road segment at a high rate of speed due to the increased amount of calculations. Nevertheless, even in such circumstances it remains important for the vehicle to continue to quickly and efficiently generate a path that avoids occupant discomfort and possible collision with an obstacle.

SUMMARY

Example systems and methods relating to generating a path for a vehicle to travel are disclosed. In one embodiment, a path generating system for improving the speed and accuracy of generating a path for a vehicle is disclosed. The path generating system includes one or more processors and a memory communicably coupled to the one or more processors. The memory stores a perception module including instructions that when executed by the one or more processors cause the one or more processors to generate left boundary points and right boundary points of a corridor in which the vehicle is to travel based at least in part on data from the sensor system. The memory further stores a boundary module including instructions that when executed by the one or more processors cause the one or more processors to create point pairs from the left boundary points and the right boundary points, wherein respective ones of the point pairs include one of the left boundary points and one of the right boundary points that is a closest corresponding point of the right boundary points. The memory also stores a path generation module including instructions that when executed by the one or more processors cause the one or more processors to generate an output path according to an optimization problem that determines path points, with a respective one of the path points for each of the point pairs. The optimization problem includes: i) a smoothness term that increases smoothness of the output path, and ii) a shortness term that reduces a length of the output path and decreases smoothness of the output path. The point pairs function as hard constraints for the corresponding respective ones of the path point.

In one embodiment, a method for generating a path is disclosed. The method includes receiving left boundary points and right boundary points of a corridor in which the vehicle is to travel, creating point pairs from the left boundary points and the right boundary points, wherein respective ones of the point pairs include one of the left boundary points and one of the right boundary points that is a closest corresponding point of the right boundary points, and generating an output path according to an optimization problem that determines path points, with a respective one of the path points for each of the point pairs. Determining the path points includes determining point positions for the path points according to: i) a smoothness term that increases smoothness of the output path, and ii) a shortness term that reduces a length of the output path and decreases smoothness of the output path. The point pairs function as hard constraints for the corresponding respective ones of the path point.

In one embodiment, a non-transitory computer-readable medium for generating a path is disclosed. The non-transitory computer-readable medium includes instructions that when executed by one or more processors cause the one or more processors to perform one or more functions. The instructions include instructions to receive left boundary points and right boundary points of a corridor in which the vehicle is to travel. The instructions further include instructions to create point pairs from the left boundary points and the right boundary points, wherein respective ones of the point pairs include one of the left boundary points and one of the right boundary points that is a closest corresponding point of the right boundary points. The instructions also include instructions to generate an output path according to an optimization problem that determines path points, with a respective one of the path points for each of the point pairs. Determining the path points includes determining point positions for the path points according to: i) a smoothness term that increases smoothness of the output path, and ii) a shortness term that reduces a length of the output path and decreases smoothness of the output path. The point pairs function as hard constraints for the corresponding respective ones of the path point.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with optimizing a vehicle path is disclosed. As previously described, a vehicle, such as an autonomous vehicle, may generate and at least semi-continuously update a path as the vehicle travels along a road segment. One of the main challenges in developing a practical path planner for free-space navigation zones (e.g., unrestrained areas) arises from the fact that the space of all vehicle controls (and hence trajectories) is continuous, leading to a complex, continuous-variable optimization problem that can be computationally prohibitive for real-time implementation.

Accordingly, the path generating system described herein, in one embodiment, can improve the speed and efficiency of path planning while at the same time considering secondary factors impacting the output path, such as comfort and travel time by utilizing a nonlinear optimization problem formulated to determine a path that falls between hard constraints. In one embodiment, the system receives a left boundary point and a corresponding right boundary point and determines an output path point between the points in a linear fashion by optimizing the ratio between the two points, where the ratio is dependent on how far the output path point is from the left and right boundary points. The system provides improved efficiency over conventional techniques by optimizing scalars instead of points of nonlinear hard boundaries to generate the output path. Additionally, the disclosed system, in one approach, improves the output path by implementing curvature and smoothness terms as part of the cost function in the optimization problem.

Figure 1:
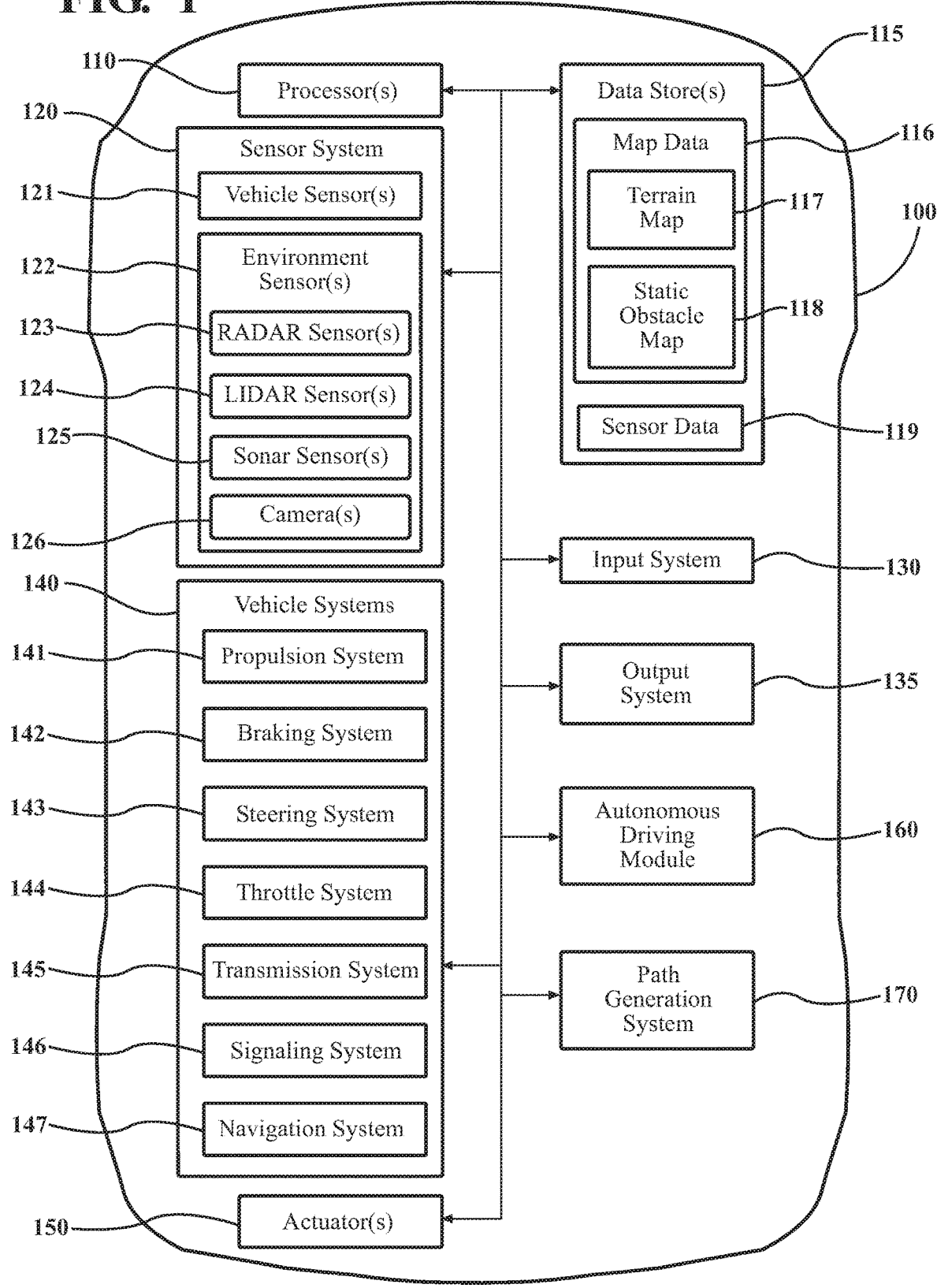
FIG. 1 illustrates one embodiment of a vehicle within which systems and methods disclosed herein may be implemented.

FIG. 1 shows an example vehicle 100 that can implement the disclosed path generating system. The vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a path generation system 170 that is implemented to perform methods and other functions as disclosed herein relating to determining optimal paths for the vehicle 100. The noted functions and methods will become more apparent with a further discussion of the figures.

Figure 2:
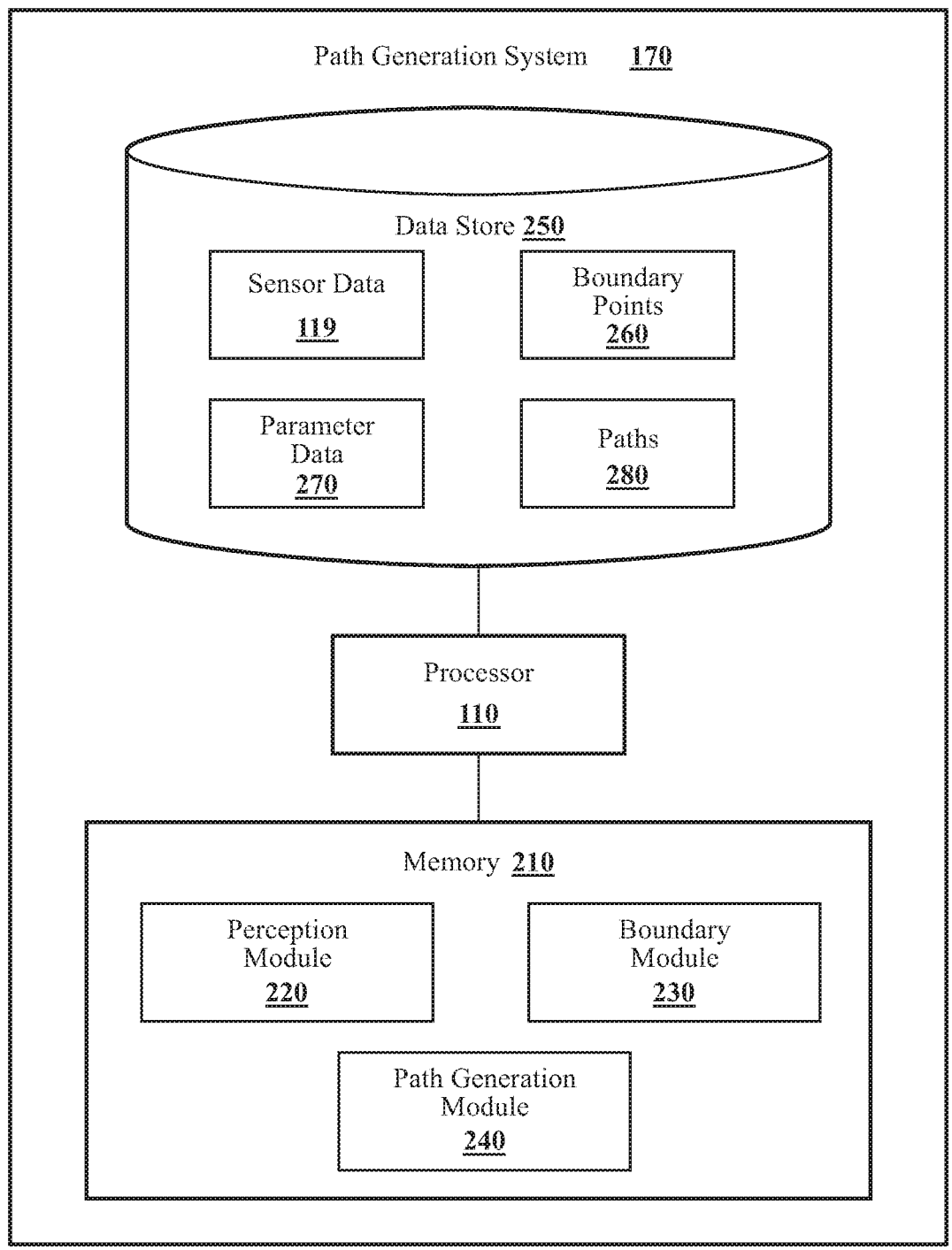
FIG. 2 illustrates one embodiment of a path generation system according to the disclosed subject matter.

With reference to FIG. 2, one embodiment of the path generation system 170 of FIG. 1 is further illustrated. The path generation system 170 is shown as including a processor 110 from the vehicle 100 of FIG. 1. Accordingly, the processor 110 may be a part of the path generation system 170, the path generation system 170 may include a separate processor from the processor 110 of the vehicle 100 or the path generation system 170 may access the processor 110 through a data bus or another communication path. It should be appreciated, that while the path generation system 170 is illustrated as being a single contained system, in various embodiments, the path generation system 170 is a distributed system that is comprised of components that can be provided as a centralized server, a cloud-based service, and so on.

In one or more embodiments, the path generation system 170 includes a memory 210 that stores a perception module 220, a boundary module 230, and a path generation module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that when executed by the processor 110 cause the processor 110 to perform the various functions disclosed herein. Moreover, as previously noted, in various embodiments, one or more aspects of the path generation system 170 are implemented as cloud-based services, and so on. Thus, one or more modules of the path generation system 170 may be located remotely from other components and may be implemented in a distributed manner.

Furthermore, in one embodiment, the path generation system 170 includes a data store 250, which is, in one embodiment, a database 250. The database 250 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 250 stores data used by the modules 220, 230, and 240 in executing various functions. In one embodiment, the database 250 includes sensor data 119 along with, for example, other information that is used and/or generated by the modules 220, 230, and 240 such as boundary points 260, parameter data 270 and path 280. Of course, in further embodiments, the various information may be stored within the memory 210 or another suitable location.

The perception module 220 can detect left and right boundaries of a road segment based on sensor data 119 obtained from one or more environmental sensors 122 of the sensor system 120 of the vehicle 100. As will be discussed further below referencing FIG. 1, the environmental sensors 122 can include one or more of RADAR sensors 123, LIDAR sensors 124, sonar sensors 125, camera 126, or other types of sensors. The boundaries detected by the perception module 220 can form a corridor that represents a road or lane boundaries and excludes potential obstacles that are in the path of the vehicle. The perception module 220 can generate the corridor boundaries on an ongoing basis, e.g., over the next hundred meters.

The perception module 220 can localize the corridor boundaries into left and right boundary points 260, which can be stored in the database 250. The left boundary points can represent a left side of the corridor relative to the vehicle 100, i.e., including n number of boundary points, while the right boundary points can represent a right side of the corridor relative to the vehicle 100, i.e., with m number of boundary points. The resolution of the left and right sides of the corridor, which effectively determines the resolution of the output path, is determined, in one approach, by the number n, m of left and right boundary points 260, and can be based on a user adjustable parameter, as will be discussed further below.

In one or more embodiments, the boundary points 260 correspond to each other and such that there is one left boundary point for every right boundary point. In one or more embodiments, the distance between successive left and right boundary point pairs is not necessarily equal and can depend in part on a desired resolution of the path.

The boundary module 230 processes the boundary points 260 to create point pairs from the left boundary points and the right boundary points. The boundary module 230 can create each point pair to include a left boundary point and a closest corresponding right boundary point among the boundary points 260.

Figure 3:
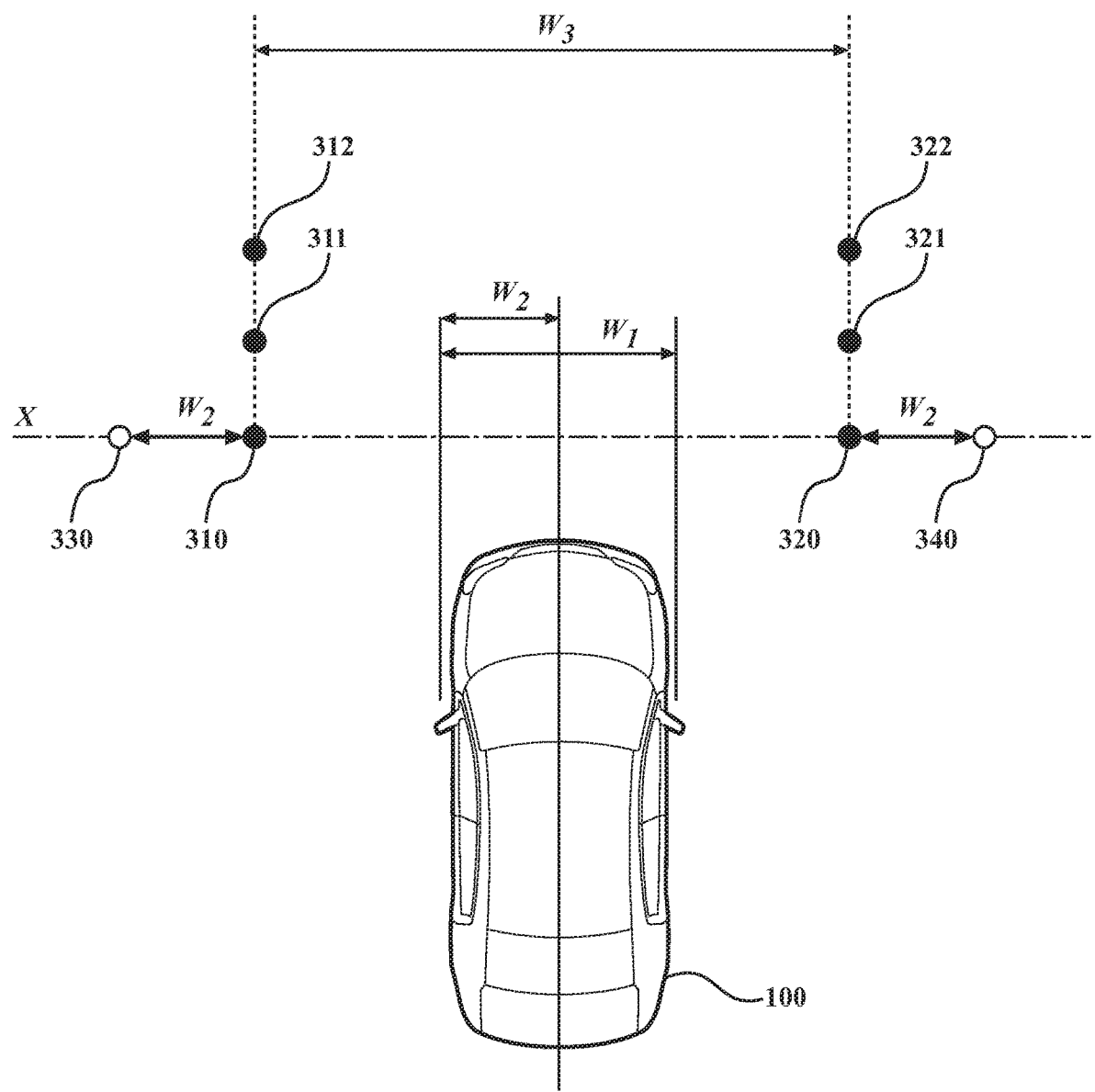
FIG. 3 illustrates left and right boundary points according to the disclosed subject matter.

The boundary module 230 can adjust the coordinates of one or more of the point pairs, for example, to account for a width of the vehicle in the corridor. As shown in FIG. 3, the boundary module 230 has shifted the left boundary point 310 and right boundary point 320 toward each other along an axis X that passes through both points. In this example, the boundary module 230 shifts the left boundary point 310 from original position 330 a distance $W_2$, which is equal to ½ the width $W_1$ of the vehicle 100. Similarly, the boundary module 230 shifts the right boundary point 320 from original position 340 a distance $W_2$. The boundary module 230 shifts subsequent left boundary points 311, 312 and right boundary points 321, 322 closer together in a similar manner. Accordingly, the corridor width W3 is reduced.

Although in this example the boundary module 230 shifted the boundary points a distance $W_2$ equal to half the width of the vehicle, other distances can be used, such as a predetermined distance independent of the width of the vehicle, a dynamically determined distance, or other distance. For example, the two boundary point pairs that are closest to the center of the vehicle front bumper and rear bumper (or any other two vehicle reference points on the vehicle symmetry axis) may be further reduced in width to ensure the path is close to the current vehicle pose (i.e., to ensure that the output path "passes through" the vehicle).

The path generation module 240 generates an output path within the corridor formed by the point pairs by determining path points that fall on respective line segments that connect corresponding point pairs. In one or more embodiments the path generation module 240 determines the position of the path points according to a nonlinear optimization problem with a cost function that includes a smoothness term that increases smoothness of the output path and a shortness term that reduces a length of the output path and decreases smoothness of the output path, and is subject to the point pairs functioning as hard constraints for the corresponding respective ones of the path points. In one or more embodiments, the optimization problem is defined as:

$$\min_{t_0,\ldots,t_{n-1}}, \ldots, \quad \text{(Eq. 1)}$$

$$t_{n-1}\sum_{i=1}^{n-2}\left(\frac{P_{i+1}(t_{i+1}) - P_i(t_i)}{\|P_{i+1}(t_{i+1}) - P_i(t_i)\|} - \frac{P_i(t_i) - P_{i-1}(t_{i-1})}{\|P_i(t_i) - P_{i-1}(t_{i-1})\|}\right)^2 +$$

$$w_{Length}\sum_{i=1}^{n-1}((P_i(t_i) - P_{i-1}(t_{i-1}))^2$$

subject to: $0 \le t_i \le 1$, for $i = 0, \ldots, n-1$ $P_i(t_i) = P_{Ri} + (1 - t_i)(P_{Li} - P_{Ri})$, for $i = 0, \ldots, n-1$ where $w_{Length}$ represents a path length bias, $P_{Li}$ represents a left boundary point of the left boundary points, $P_{Ri}$ represents a right boundary point of the right boundary points and $P_i$ represents an output path point.

The $t_i$ variable represents a scale factor that varies each point $P_i$ of the output path between the left and right boundaries of the corridor. That is, for example for a given point pair ($P_{Li}$, $P_{Ri}$), $t_i=0$ means the output path point $P_i$ falls on the left boundary point $P_{Li}$, while $t_i=1$ means the output path falls on the right boundary point $P_{Ri}$, and $t_i=0.5$ means the output path falls in the middle of the right and left boundary points ($P_{Li}$, $P_{Ri}$).

The first part of Eq. 1 represents a cost function that evaluates the quality of a path while the second part (i.e., after "subject to:") represents hard constraints of the path. Consider each pair of boundary points ($P_{Li}$, $P_{Ri}$). The cost function essentially evaluates each output point $P_i$ on a line segment that connects the pair of boundary points ($P_{Li}$, $P_{Ri}$) and finds an optimal position for each point $P_i$ to generate an output path, where the optimal position can be subject to desired features of the output path defined by the terms of the cost function.

In the cost function of Eq. 1, the first term represents smoothness, where smoothness refers to a trait of a path that measures abrupt changes or lack of abrupt changes in direction along the path. The first term smooths the output path by minimizing differences between sequential points $P_i$ in the output path, thereby reducing jerkiness in the resulting output path. This can improve driving comfort along the generated output path.

The second term in the cost function of Eq. 1 reduces an overall length of the output path. For example, as will be shown below, path generation module 240 can generate the output path to include sharp turns close to the inside of each curve to reduce the overall length of the path. This can reduce the travel time of the output path, however, it can also decrease the smoothness of the output path. The path generation module 240 determines priority between smoothness of an output path and reduced length of the output path based, in part, on the path length bias weight $w_{Length}$, which, in one approach, can be adjusted by an electronic signal that is automatically generated by the system 170 according to defined conditions or according to inputs received by the system 170 via a user interface.

The variable n in Eq. 1 represents the number of boundary points $P_{Li}$, $P_{Ri}$ that form the boundary lines, and consequently the number of path points $P_i$ that form the output path (i.e., n−1 is the last point). The variable n determines a resolution of the corridor boundary lines and the output path. The variable n can be a parameter that a user can adjust via a user interface. If the path generation system 170 receives boundary lines that have fewer number of points than n (e.g., receive low resolution boundary lines from the perception system), then the boundary module 230 can include additional points in the boundary lines to increase the resolution until it reaches n number of points. For example, the boundary module 230 can calculate positions of additional points to fall between already known boundary line points.

Figure 4:
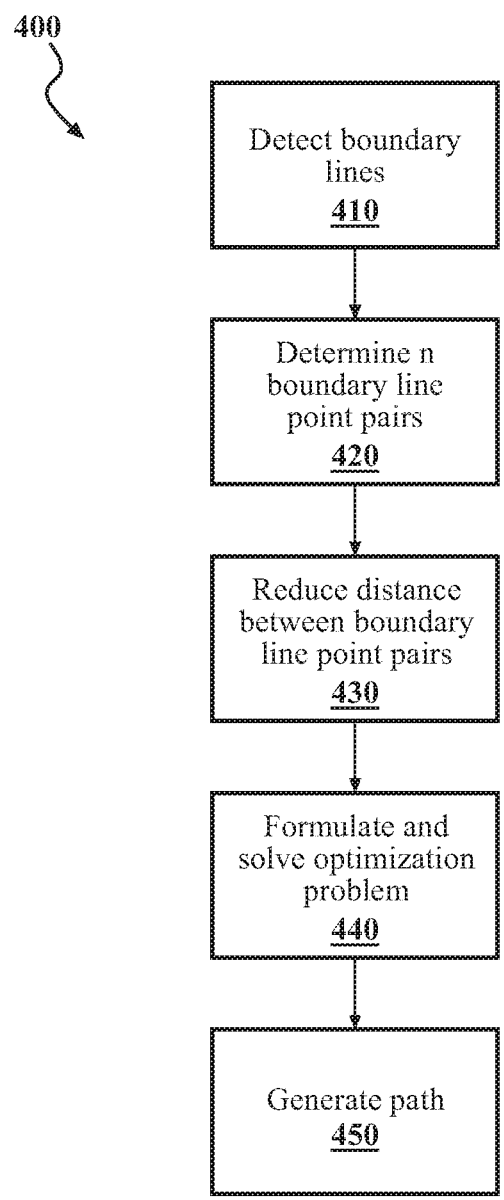
FIG. 4 illustrates a flowchart of a method that is associated with generating path for a vehicle according to the disclosed subject matter.

Additional aspects of generating a path will be discussed in relation to FIG. 4. FIG. 4 illustrates a flowchart of a method 400 that is associated with generating a path with hard constraints and optimized for desired features. The method 400 will be discussed from the perspective of the path generation system 170 of FIGS. 1 and 2. While the method 400 is discussed in combination with the path generation system 170, it should be appreciated that the method 400 is not limited to being implemented within the path generation system 170 but is instead one example of a system that may implement the method 400.

At operation 410, the perception module 220 detects left and right boundaries of a segment of a corridor based on sensor data. The corridor can represent, for example, a road that the vehicle is travelling on, obstacles in the road, other vehicles in the road, and the like.

At operation 420 the boundary module 230 determines n number of boundary line points pairs based on the corridor boundary lines. Each boundary point pair includes a left boundary point $P_{Li}$, that falls on the left boundary line and a right boundary point $P_{Ri}$ that falls on the right boundary line. In one or more embodiments the right boundary point $P_{Ri}$ is a closest corresponding point to the left boundary point $P_{Li}$, from among the points that fall on the right boundary line.

At operation 430 the boundary module 230 reduces a distance between boundary line point pairs, thereby reducing a width of the corridor. The amount of reduction can be based on the width of the vehicle, for example, one half of the vehicle width, or can be a preset fixed amount or a dynamically determined amount. As will be seen below, this reduction mitigates against a side of the vehicle passing outside of the detected corridor.

At operation 440 the path generation module 240 formulates and solves a nonlinear optimization problem, such as Eq. 1, for generating path points $P_i$ that form a path in the corridor. In one or more embodiments the nonlinear optimization problem can include a smoothness term that increases smoothness of the output path by attempting to equalize sequential delta vectors in point positions and a path length term that attempts to reduce a length of the output path. In one or more embodiments the path length term may reduce a length of the path at the cost of smoothness. Furthermore, the path generation module 240 can receive one or more signals generated from a user interface to set values for parameters of the problem, such as a value for a path resolution n value and a value for path length bias $w_{Length}$ that controls how much the path generation module 240 biases the output path to prioritize reducing the output path length over smoothing the output path.

The path generation module 240 can formulate the nonlinear optimization problem to include hard constraints that define an allowable range of values that the output path may fall within. In one or more embodiments, the boundary line point pairs ($P_{Li}$, $P_{Ri}$) define the hard constraints of the nonlinear optimization problem such that the output path points do not violate the hard constraints. That is, each output path point will fall between a corresponding pair of boundary point $P_{Li}$, $P_{Ri}$. In this manner the possible output paths are reduced to a limited range, thereby reducing calculation time of the optimized output path and enhancing real-time calculation of a path that is guided by traits desired by a user, where the traits can be dynamically adjusted during a drive.

Figure 5:
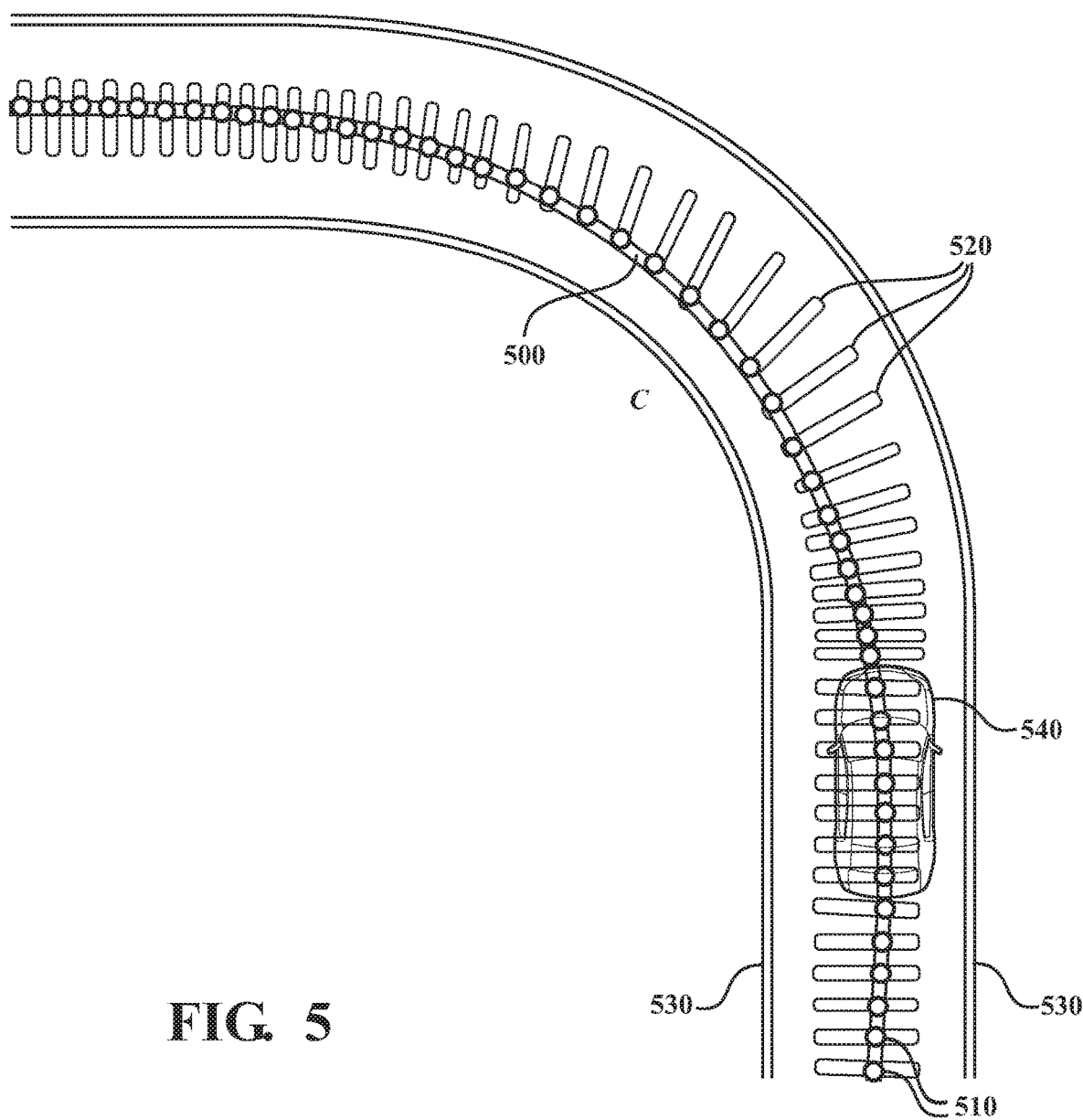
FIG. 5 illustrates an output path according to the disclosed subject matter.

At operation 450 the path generation module 240 generates a path from the nonlinear optimization problem, using the point pairs as inputs. FIG. 5 shows an example path 500 generated by the path generation module 240. The path 500 includes generated path points 510. Each path point 510 falls within a respective line segment representing a boundary point pair range 520. As can be seen, the boundary pair ranges 520 have been reduced to have a width that is less than the width of the corridor 530.

In the scenario of the example path 500 shown in FIG. 5, the path generation module 240 has generated the path to have a reduced length. Accordingly, the path points 510 in the curve region C fall as close to the inside of the curve as possible. Due to the boundary module 230 having reduced the width of the boundary ranges 520, and due to the hard constraints enforced by the boundary ranges 520, the output path 500 does not guide the vehicle 540 to pass outside of the corridor 530 (e.g., the road). Thus, as the vehicle 540 travels on the path, even through a sharp turn into the curve to shorten the travel time, the vehicle 540 will not pass out of the corridor 530.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s)

110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the path generation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the path generation system 170, and/or the autonomous driving module(s) 160 may control some or all of these vehicle systems 140 and, thus, may be partially or fully autonomous.

The processor(s) 110, the path generation system 170, and/or the autonomous driving module(s) 160 can be operatively connected to communicate with the various vehicle systems 140 and/or individual components thereof. For example, returning to FIG. 1, the processor(s) 110, the path generation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the path generation system 170, and/or the autonomous driving module(s) 160 may control some or all of these vehicle systems 140.

The processor(s) 110, the path generation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the path generation system 170, and/or the autonomous driving module(s) 160 can control the direction and/or speed of the vehicle 100. The processor(s) 110, the path generation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the path generation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A path generation system for generating a path for a vehicle to travel, comprising:
   a sensor system;
   one or more processors;
   a memory communicably coupled to the one or more processors and storing:
      a perception module including instructions that when executed by the one or more processors cause the one or more processors to generate left boundary points and right boundary points of a corridor in which the vehicle is to travel based at least in part on data from the sensor system;
      a boundary module including instructions that when executed by the one or more processors cause the one or more processors to create point pairs from the left boundary points and the right boundary points, wherein respective ones of the point pairs include one of the left boundary points and one of the right boundary points that is a closest corresponding point of the right boundary points; and
      a path generation module including instructions that when executed by the one or more processors cause the one or more processors to generate an output path according to an optimization problem that determines path points, with a respective one of the path points for each of the point pairs,
   wherein the optimization problem includes a cost function having:
      i) a smoothness term that increases smoothness of the output path, and
      ii) a shortness term that reduces a length of the output path and decreases smoothness of the output path, and
   wherein the point pairs function as hard constraints for the corresponding respective ones of the path point.

2. The path generation system of claim 1, wherein the boundary module further includes instructions that adjust the left boundary points and right boundary points prior to generating the output path, the adjustment including shifting the left boundary points and right boundary points closer together to reduce a width of the corridor.

3. The path generation system of claim 1, wherein the path generation module further includes instructions to, when determining the point positions according to the smoothness term, increase smoothness of the output path by attempting to equalize sequential delta vectors in the point positions.

4. The path generation system of claim 1, wherein the optimization problem is defined according to:

$$\min_{t_0,\ldots,t_{n-1},\ldots,t_{n-1}} \sum_{i=1}^{n-2} \left( \frac{P_{i+1}(t_{i+1}) - P_i(t_i)}{\|P_{i+1}(t_{i+1}) - P_i(t_i)\|} - \frac{P_i(t_i) - P_{i-1}(t_{i-1})}{\|P_i(t_i) - P_{i-1}(t_{i-1})\|} \right)^2 + w_{Length} \sum_{i=1}^{n-1} ((P_i(t_i) - P_{i-1}(t_{i-1}))^2$$

subject to: $0 \leq t_i \leq 1$, for $i = 0, \ldots, n-1$ $P_i(t_i) = P_{Ri} + (1 - t_i)(P_{Li} - P_{Ri})$, for $i = 0, \ldots, n-1$ where $w_{Length}$ represents a path length bias, $P_{Li}$ represents a left boundary point of the left boundary points, $P_{Ri}$ represents a right boundary point of the right boundary points and $P_i$ represents an output path point.

5. The path generation system of claim 4, wherein the path generation module receives, via a signal generated from a user interface, a length adjustment value that changes the $w_{Length}$ parameter to adjust biasing the output path between shortness and smoothness.

6. The path generation system of claim 4, further receiving, via a signal generated from a user interface, a resolution adjustment value that changes the n parameter to adjust a resolution of the output path.

7. The path generation system of claim 6, further comprising generating additional left boundary points $P_{Li}$ and right boundary points $P_{Ri}$ when the signal from the user interface changes the n parameter to a value that is greater than a number of the left boundary points $P_{Li}$ and right boundary points $P_{Ri}$ that were received.

8. A method of generating a path of travel for a vehicle, comprising:
   creating point pairs from left boundary points and right boundary points of a corridor in which the vehicle is to travel, wherein respective ones of the point pairs include one of the left boundary points and one of the right boundary points that is a closest corresponding point of the right boundary points; and
   generating an output path according to an optimization problem that determines path points, with a respective one of the path points for each of the point pairs, wherein determining the path points includes determining point positions for the path points according to:
      i) a smoothness term that increases smoothness of the output path, and
      ii) a shortness term that reduces a length of the output path and decreases smoothness of the output path,
   wherein the point pairs function as hard constraints for the corresponding respective ones of the path point.

9. The method of claim 8, further comprising adjusting the left boundary points and right boundary points prior to generating the output path, the adjustment including shifting the left boundary points and right boundary points closer together to reduce a width of the corridor.

10. The method of claim 8, wherein determining the point positions according to the smoothness term increases smoothness of the output path by attempting to equalize sequential delta vectors in the point positions.

11. The method of claim 8, wherein the optimization problem is defined according to:

$$\min_{t_0,\ldots,t_{n-1}},\ldots,t_{n-1} \sum_{i=1}^{n-2} \left( \frac{P_{i+1}(t_{i+1}) - P_i(t_i)}{\|P_{i+1}(t_{i+1}) - P_i(t_i)\|} - \frac{P_i(t_i) - P_{i-1}(t_{i-1})}{\|P_i(t_i) - P_i(t_{i-1})\|} \right)^2 +$$

$$w_{Length} \sum_{i=1}^{n-1} ((P_i(t_i) - P_{i-1}(t_{i-1}))^2$$

subject to: $0 \leq t_i \leq 1$, for $i = 0, \ldots, n-1$ $P_i(t_i) = P_{Ri} + (1 - t_i)(P_{Li} - P_{Ri})$, for $i = 0, \ldots, n-1$ where $w_{Length}$ represents a path length bias, $P_{Li}$ represents a left boundary point of the left boundary points, $P_{Ri}$ represents a right boundary point of the right boundary points and $P_i$ represents an output path point.

12. The method of claim 11, further receiving, via a signal generated from a user interface, a length adjustment value that changes the $w_{Length}$ parameter to adjust biasing the output path between shortness and smoothness.

13. The method of claim 11, further receiving, via a signal generated from a user interface, a resolution adjustment value that changes the n parameter to adjust a resolution of the output path.

14. The method of claim 13, further comprising generating additional left boundary points $P_{Li}$ and right boundary points $P_{Ri}$ when the signal from the user interface changes the n parameter to a value that is greater than a number of the left boundary points $P_{Li}$ and right boundary points $P_{Ri}$ that were received.

15. A non-transitory computer-readable medium for generating a path of travel for a vehicle and including instructions that when executed by one or more processors cause the one or more processors to:
  receive left boundary points and right boundary points of a corridor in which the vehicle is to travel;
  create point pairs from the left boundary points and the right boundary points, wherein respective ones of the point pairs include one of the left boundary points and one of the right boundary points that is a closest corresponding point of the right boundary points; and
  generate an output path according to an optimization problem that determines path points, with a respective one of the path points for each of the point pairs, wherein determining the path points includes determining point positions for the path points according to:
    i) a smoothness term that increases smoothness of the output path, and
    ii) a shortness term that reduces a length of the output path and decreases smoothness of the output path,
  wherein the point pairs function as hard constraints for the corresponding respective ones of the path point.

16. The non-transitory computer-readable medium of claim 15, further including instructions that adjust the left boundary points and right boundary points prior to generating the output path, the adjustment including shifting the left boundary points and right boundary points closer together to reduce a width of the corridor.

17. The non-transitory computer-readable medium of claim 15, further including instructions that, when determining the point positions according to the smoothness term, increases smoothness of the output path by attempting to equalize sequential delta vectors in the point positions.

18. The non-transitory computer-readable medium of claim 15, wherein the optimization problem is defined according to:

$$\min_{t_0,\ldots,t_{n-1}},\ldots,t_{n-1} \sum_{i=1}^{n-2} \left( \frac{P_{i+1}(t_{i+1}) - P_i(t_i)}{\|P_{i+1}(t_{i+1}) - P_i(t_i)\|} - \frac{P_i(t_i) - P_{i-1}(t_{i-1})}{\|P_i(t_i) - P_i(t_{i-1})\|} \right)^2 +$$

$$w_{Length} \sum_{i=1}^{n-1} ((P_i(t_i) - P_{i-1}(t_{i-1}))^2$$

subject to: $0 \leq t_i \leq 1$, for $i = 0, \ldots, n-1$ $P_i(t_i) = P_{Ri} + (1 - t_i)(P_{Li} - P_{Ri})$, for $i = 0, \ldots, n-1$ where $w_{Length}$ represents a path length bias, $P_{Li}$ represents a left boundary point of the left boundary points, $P_{Ri}$ represents a right boundary point of the right boundary points and $P_i$ represents an output path point.

19. The non-transitory computer-readable medium of claim 18, further including instructions for receiving, via a signal generated from a user interface, a length adjustment value that changes the $w_{Length}$ parameter to adjust biasing the output path between shortness and smoothness.

20. The non-transitory computer-readable medium of claim 18, further including instructions for receiving, via a signal generated from a user interface, a resolution adjustment value that changes the n parameter to adjust a resolution of the output path.

* * * * *